United States Patent
Kotecha et al.

(10) Patent No.: US 10,070,198 B2
(45) Date of Patent: Sep. 4, 2018

(54) USER FEEDBACK BASED CONTENT DISTRIBUTION AREA

(71) Applicant: Verizon Patent and Licensing Inc., Basking Ridge, NJ (US)

(72) Inventors: Lalit R. Kotecha, San Ramon, CA (US); Rakesh Chandwani, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 14/267,370

(22) Filed: May 1, 2014

(65) Prior Publication Data

US 2015/0319472 A1 Nov. 5, 2015

(51) Int. Cl.
| | |
|---|---|
| H04N 21/6405 | (2011.01) |
| H04N 21/258 | (2011.01) |
| H04N 21/61 | (2011.01) |
| H04M 1/725 | (2006.01) |
| H04N 21/2668 | (2011.01) |

(52) U.S. Cl.
CPC .... *H04N 21/6405* (2013.01); *H04M 1/72572* (2013.01); *H04N 21/25841* (2013.01); *H04N 21/2668* (2013.01); *H04N 21/6131* (2013.01)

(58) Field of Classification Search
CPC ................ H04N 21/2668; H04N 21/6131
See application file for complete search history.

(56) References Cited

U.S. PATENT DOCUMENTS

| | | | |
|---|---|---|---|
| 9,083,916 B2 * | 7/2015 | Castellan et al. | |
| 9,344,290 B2 * | 5/2016 | Song | H04L 12/189 |
| 2002/0194607 A1 * | 12/2002 | Connelly | H04H 60/06 725/87 |
| 2004/0045029 A1 * | 3/2004 | Matsuura | H04N 7/17318 725/93 |
| 2006/0223546 A1 * | 10/2006 | Claussen | H04W 24/02 455/456.1 |
| 2006/0259927 A1 * | 11/2006 | Acharya | H04N 7/17318 725/61 |
| 2010/0146559 A1 * | 6/2010 | Lee | H04L 12/1822 725/61 |
| 2011/0039576 A1 * | 2/2011 | Prakash et al. | 455/456.1 |
| 2012/0090007 A1 * | 4/2012 | Xiao et al. | 725/46 |
| 2013/0028118 A1 * | 1/2013 | Cherian et al. | 370/252 |
| 2013/0242763 A1 * | 9/2013 | Li | 370/252 |
| 2014/0137161 A1 * | 5/2014 | Park | 725/62 |
| 2014/0245351 A1 * | 8/2014 | Ford | H04N 21/252 725/39 |
| 2015/0223084 A1 * | 8/2015 | Lightstone | H04W 24/08 370/252 |
| 2015/0288997 A1 * | 10/2015 | Basra | H04N 21/6405 725/9 |

\* cited by examiner

*Primary Examiner* — Brian T Pendleton
*Assistant Examiner* — Frank Johnson (57) ABSTRACT

A method includes providing, to a user device, an identification of a superset of potential video programs that are available to be scheduled for multicast to a content distribution area that includes a cell associated with the user device. The method also includes receiving a selection of a subset of the potential video programs from the user device and a location associated with the user device. The method further includes generating at least one content distribution area based on the location of the user device and the selection of the subset of the potential video programs.

20 Claims, 8 Drawing Sheets

| DEVICE LISTING 610 | PREFERENCE 620 | SERVING ENB 630 | ADJOINING ENB 640 |
|---|---|---|---|
| DEVICE 1 | VP1, VP2, VP3 | ENB ADDRESS A | ENB ADDRESS B, D |
| DEVICE 2 | VP3, VP6, VP1 | ENB ADDRESS A | ENB ADDRESS B, D |
| DEVICE 3 | VP1, VP5, VP2 | ENB ADDRESS B | ENB ADDRESS C, A |
| DEVICE 4 | VP2, VP6, VP3 | ENB ADDRESS B | ENB ADDRESS C, A |
| DEVICE 5 | VP4, VP5, VP8 | ENB ADDRESS B | ENB ADDRESS C, A |

USER FEEDBACK BASED CONTENT DISTRIBUTION AREA

BACKGROUND

Mobile broadcast and multicast systems typically use a fixed radio modulation scheme, known as a modulation and coding scheme (MCS), to provide unified decoding of content from signals received within a cell coverage area. Additionally, a forward error correction (FEC) scheme may be applied to the signal at an application level to provide additional protection against packet loss. The FEC scheme provides data reliability by introducing a known structure into a data sequence prior to transmission.

Enhanced multimedia broadcast and multicast service (eMBMS) is a data and content multicasting technology that is used to distribute identical content to multiple different (and, often independent) user elements (UEs) on cellular networks. In current network technology, the centrally located broadcast and multicast service center (BMSC) typically selects the area of content distribution and the participating base stations in multicast content distribution activities. The BMSC may determine a content distribution area (also known as a multicast broadcast single frequency network (MBSFN)) and configure all the base stations (typically enhanced node base stations or eNodeBs) in that area to broadcast particular content at a prescheduled time. The BMSC may multicast particular content at that time and whichever UE chooses to consume the content may access the content via an application running on the UE.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may determine a user feedback based content distribution area. The systems may provide a superset of video programs that may be scheduled to be multicast at a particular time to user devices. The users may select preferred content from the superset. The systems may receive various types of information from user devices regarding how many user devices are interested in content consumption and the location of the user devices. The systems may determine a schedule of programs and corresponding content distribution areas based on the user feedback. The systems may enable the implementation of intelligent and informed user feedback based content distribution area and substantially reduce utilization of network resources by targeting distribution of content only in the areas where interested users are located, without substantially reducing the quality of experience (QOE) for the users. In some instances, the systems may increase the QOE. The programs that are multicast in a particular content distribution area may be selected based on popularity, sponsorship, available resources, etc. The systems may create (or generate) the content distribution areas and, in some instances, dynamically grow the content distribution areas based on additional user devices showing interest in content consumption.

Figure 1:
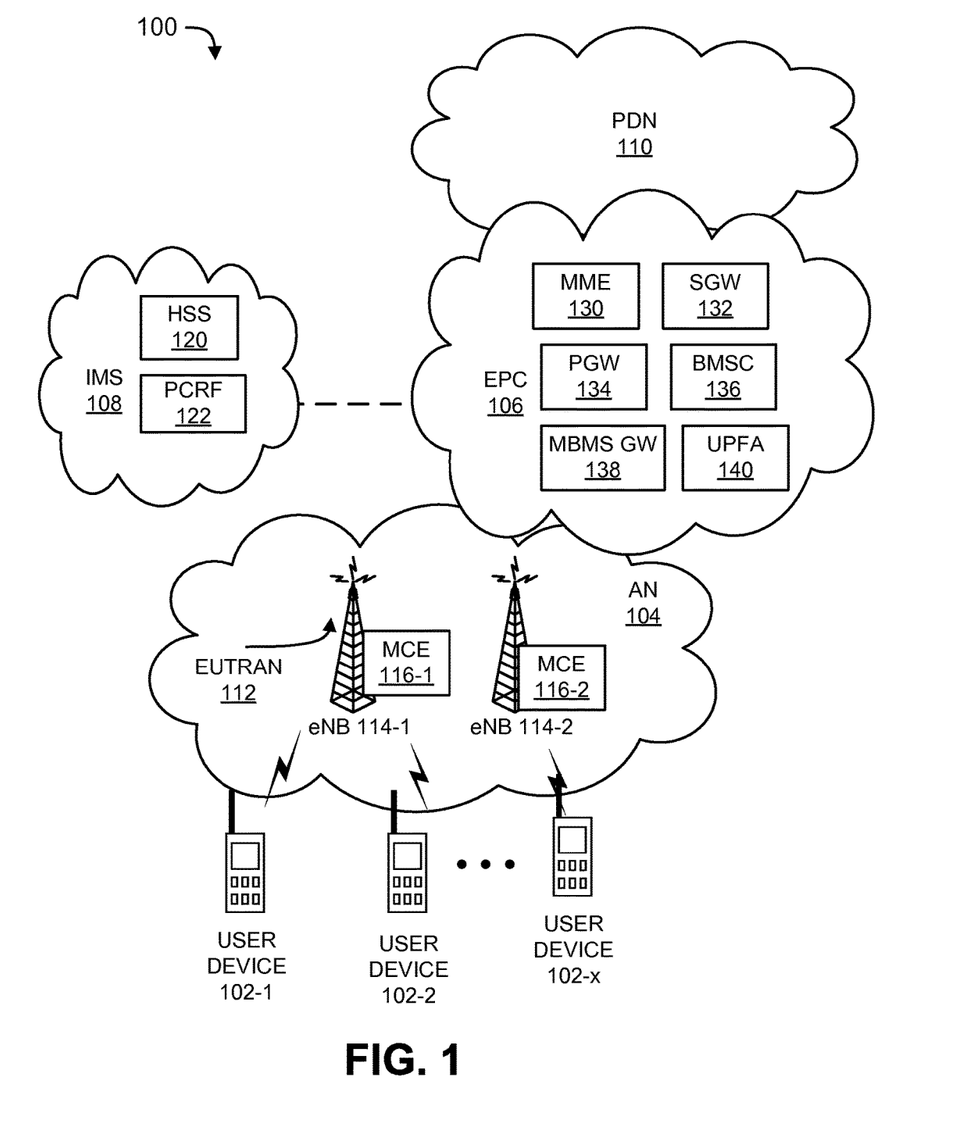
FIG. 1 is an exemplary long term evolution (LTE) network in which systems and/or methods described herein may be implemented.

FIG. 1 is a diagram of an exemplary LTE network 100. As illustrated, LTE network 100 includes a number of user devices (also referred to as user elements (UEs) or user components) 102-1, 102-2 and 102-x (collectively referred to as user devices 102 or individually as user device 102), an access network (AN) 104, an evolved packet core (EPC) network 106, an Internet Protocol Multimedia subsystem (IMS) network 108, and a packet data network (PDN) 110, such as the Internet or a proprietary packet data network. AN 104 may include an evolved universal terrestrial radio access network (E-UTRAN) 112 and a number of eNodeBs (eNBs) 114-1 and 114-2 or enhanced node base stations (collectively referred to as eNBs 114 or individually as eNB 114). Each eNB 114 may include a corresponding multicast coordination entity (MCE) 116 (respectively MCE 116-1, 116-2 and 116-x, collectively referred to as MCEs 116 or individually as MCE 116). IMS 108 may include a home subscriber server (HSS)/authentication, authorization, and accounting (AAA) server 120, and a policy and charging rules function (PCRF) device 122. EPC 106 may include a mobility management entity (MME) 130, a serving gateway (SGW) 132, and a PDN (packet data network) gateway (PGW) 134. A broadcast multicast service center (BMSC) 136, a multimedia broadcast multicast service gateway (MBMS GW) 138 and a user preference feedback analytics (UPFA) server 140 may also be deployed in EPC 106. Devices/networks of network 100 may interconnect via wired and/or wireless connections.

Three user devices 102, a single AN 104, EPC 106, PDN 110, E-UTRAN 112, two eNBs 114, HSS 120, PCRF 122, MME 130, SGW 132, PGW 134, BMSC 136, MBMS GW 138 and a single UPFA server 140 have been illustrated in FIG. 1 for simplicity. In practice, there may be more or fewer devices or components. For example, a typical network 100 includes millions of subscriber user devices 102, thousands of eNBs 114, hundreds of SGWs 132 and several PGWs 134, and MBMS GWs 138 effectively forming a hierarchical access network in which traffic passes from PDN 110 to user device 102 via, for example, a particular SGW 132, PGW 134, MBMS GW 138, and eNB 114.

User device 102 may include a mobile (e.g., cellular) telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, user devices 102 may include any device that is capable of communicating over access network 104, EPC network 106, and/or PDN 110. User device 102 operates according to one or more versions of the LTE communication standard.

Access network 104 includes a communications network that connects subscribers (e.g., user device 102) to a service provider. In one example, access network 104 may include a WiFi network or other access networks (e.g., in addition to E-UTRAN 112). EPC 106 may include a core network architecture of the Third generation partnership project (3GPP) LTE wireless communication standard. PDN 110 includes a network that provides data services (e.g., via packets or any other Internet protocol (IP) datagrams). For example, PDN 110 may include the Internet, an intranet, an asynchronous transfer mode (ATM) network, etc.

E-UTRAN 112 includes a radio access network capable of supporting high data rates, packet optimization, large capacity and coverage, etc. E-UTRAN 112 includes a number of eNBs 14.

eNBs 114 includes network devices that operate according to one or more versions of the LTE communication standard. For example, eNBs 114 may be configured to respond to user device requests, forward information regarding user devices 102 to MME 130 and/or SGW 132, set up tunneling sessions with other devices (e.g., SGW 132 and PGW 134), etc. eNBs 114 are base stations in network 100 and may include control plane connections to other network elements. eNBs 114 may include MCEs 116.

MCEs 116 may allocate radio resources used by all eNBs 114 in content distribution area (e.g., a multicast/broadcast single frequency network (MBSFN) area) for multi-cell MBMS transmissions using MBSFN operations. The MBSFN area is a specific area in which multiple cells transmit the same content using a single frequency network. Each eNB 114 may have an associated MCE 116, which may be integrated into the eNB 114. Alternatively, MCEs 116 may be part of another network element. When the MCE 116 is part of another network element, a single MCE 116 serves each eNB 114. In addition to allocation of the time/frequency radio resources, MCEs 116 may also determine or implement further details of the radio configuration, such as the MCS. The MCE may also be involved in MBMS session control signaling.

HSS/AAA 120 is configured to include a master user database that supports devices on PDN 110 that handle calls, such as proxy devices, session border controllers, etc. HSS/AAA 120 may contain subscription-related information (e.g., subscriber profiles), may perform authentication and authorization of a user based on requests received from MME 130, and may provide information about a subscriber's location and IP information.

PCRF 122 provides policy control decision and flow based charging control functionalities. PCRF 122 may provide network control regarding service data flow detection, gating, quality of service (QoS) and flow based charging, etc. PCRF 122 may determine how a certain service data flow shall be treated, and may ensure that user plane traffic mapping and treatment is in accordance with a user's subscription profile.

MME 130 is responsible for idle mode tracking and paging procedures (e.g., including retransmissions) for user device 102. For example, MME 130 maintains information regarding a current state (e.g., powered on, location, etc.) of user device 102. MME 130 is also involved in the bearer activation/deactivation process (e.g., for user device 102) and operates to choose a particular SGW 132 for user device 102 at an initial attach time and at a time of intra-LTE handover. In addition, MME 130 authenticates user device 102 (e.g., via interaction with HSS 120). Non-access stratum (NAS) signaling terminates at MME 130 and MME 130 generates and allocates temporary identities to user equipment (e.g., user device 102).

Furthermore, MME 130 may check authorization of user device 102 to connect to a service provider's Public Land Mobile Network (PLMN) and may enforce roaming restrictions for user device 102. MME 130 may be a termination point in EPC network 106 for ciphering/integrity protection for NAS signaling and may handle security key management. MME 130 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) and MME 130 in an LTE network) terminating at MME 130. MME 130 may also terminate an S6a interface (which enables transmission of subscription and authentication data) towards HSS 122 for roaming user devices 102.

SGW 132 routes and forwards user data packets, acts as a radio mobility anchor for a user plane during inter-eNB handovers, and also acts as a radio anchor for mobility between LTE and other 3GPP technologies (referred to as "inter-3GPP mobility"). As shown, SGW 132 is connected to eNBs 114 to provide a radio layer mobility control plane. In addition, SGW 132 manages and stores contexts associated with user device 102 (e.g., parameters of an IP bearer service, network internal routing information, etc.).

PGW 134 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 134 provides connectivity of user device 102 to external packet data networks (e.g., to PDN 110) by being a traffic exit/entry point for user device 102. As described briefly above, user device 102 may connect to PGW 134 via one or more tunnels established between eNB 114 and PGW 134, such as one or more GPRS Tunneling Protocol (GTP) tunnels. User device 102 may simultaneously connect to more than one PGW for accessing multiple PDNs. PGW 134 may perform policy enforcement, packet filtering for each user, charging support, lawful intercept, and packet screening. PGW 134 may also act as an anchor for mobility between 3GPP and non-3GPP technologies.

BMSC 136 may be a functional entity that manages provision of multicast services or broadcast services to user device 102 and an end-user, such as currently implemented in 2G and 3G MBMS architectures. Consistent with embodiments described herein, BMSC 136 may manage provisioning of base stations (eNBs 114) based on user feedback to broadcast particular content within user feedback based content distribution areas. BMSC 136 may receive information and/or instructions from UPFA server 140 to implement the user feedback based content distribution areas. BMSC 136 may provide an entry point for content providers or other broadcast/multicast source which is external to the network. BMSC 136 may perform authorization, scheduling, and security procedures in support of the multicast services or broadcast services. For example, BMSC 136 may provide authorization for terminals requesting to activate an MBMS service. BMSC 136 may schedule broadcast/multicast sessions. BMSC 136 may also implement integrity and confidentiality protection of MBMS data and may issue MBMS session announcements.

BMSC 136 may support MBMS bearer signaling that sets up and releases context at the establishment and termination of MBMS sessions. BMSC 136 may also support user related signaling, e.g., for multicast session authorization, or user session joining or detaching from multicast sessions.

MBMS GW 138 may send/broadcast MBMS packets to each eNB 114 transmitting the (broadcast or multicast) service. MBMS GW 138 may be a logical entity that is present between BMSC 136 and eNBs 114 in network 100. MBMS GW 138 may be part of another network element, such as a router, etc. MBMS GW 138 may use IP multicast to forward MBMS user data to eNB 114. MBMS GW 138 may perform MBMS session control signaling (e.g., session start/stop) towards the E-UTRAN 112 via MME 130.

UPFA server 140 may receive user feedback information regarding preferences for scheduling video programs to be multicast at predetermined times. UPFA server 140 may receive various types of information from user devices 102 that tells UPFA server 140 how many user devices 102 are interested in content consumption and where these user devices 102 are located. UPFA server 140 may intelligently create the content distribution areas and, in some instances, dynamically grow content distribution areas based on more user devices 102 indicating interest in content consumption, such as described herein below with respect to FIG. 4. In some implementations, UPFA server 140 may be independently located in EPC 106 (i.e., an independent logical "stand alone" entity). Alternatively, User feedback analytics server 140 may be implemented as a component of another network device, such as BMSC 136. Although particular functions are described with respect to UPFA server 140.

In implementations described herein, content distribution areas may be determined based on user feedback. The user feedback may include identification or selection of preferred content selected via a super content electronic program guide (EPG) selection interface. The systems may enable the implementation of intelligent and informed content distribution area and save network resources by targeting content only in the areas where interested users are without substantially reducing (and in some instances, while substantially increasing) the QOE for the users.

Figure 2:
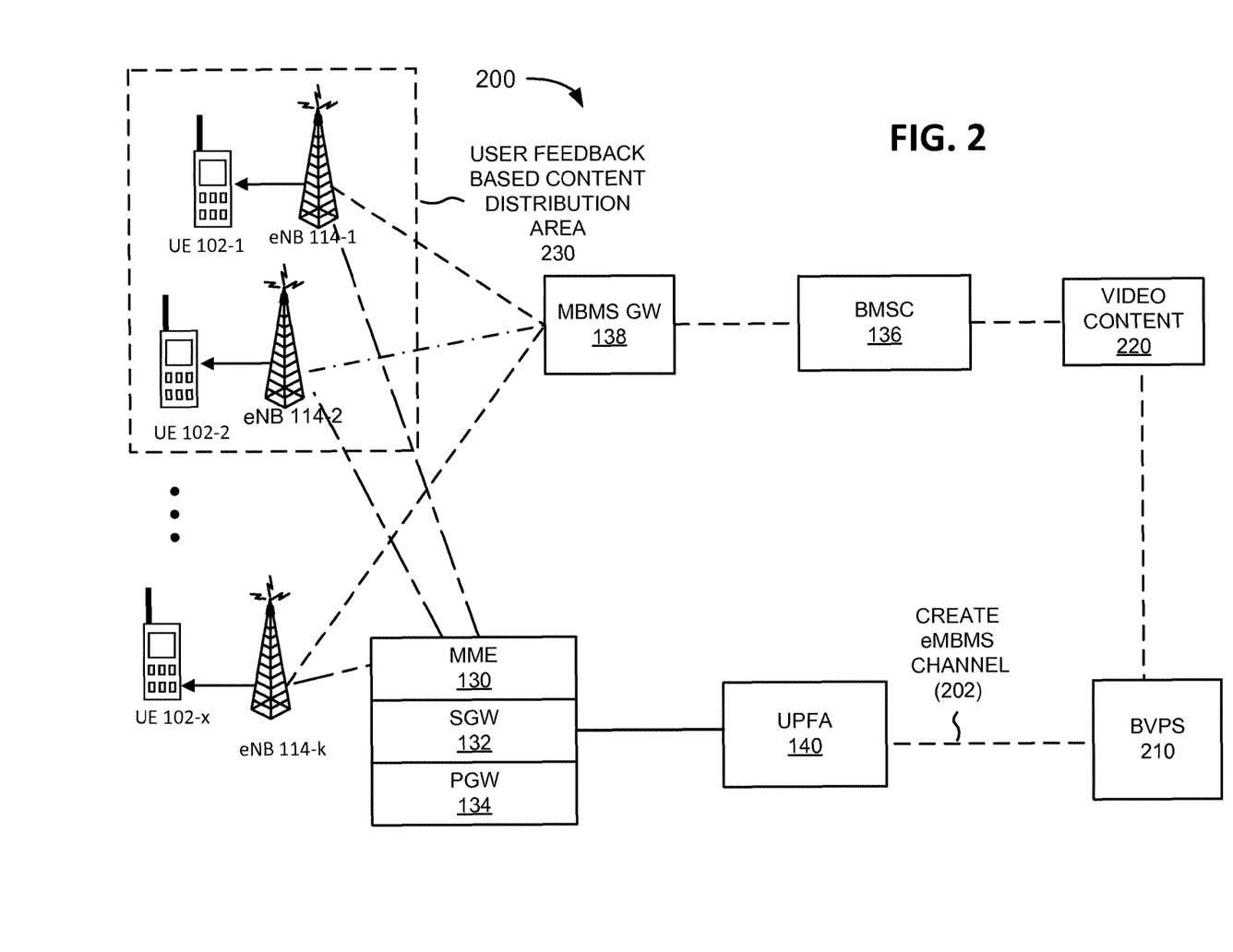
FIG. 2 is a diagram of an exemplary content distribution network architecture including user feedback associated components in which systems and/or methods described herein may be implemented.

FIG. 2 is a diagram of an exemplary content distribution network architecture 200. Architecture 200 may include user devices 102, eNBs 114, MME 130, SGW 132, PGW 134, BMSC 136, MBMS GW 138, UPFA server 140, broadcast video provisioning system (BVPS) 210 and video content source 220. The eNBs 114 may serve a particular content distribution area 230. The exemplary configuration illustrated in FIG. 2 is provided for simplicity. It should be understood that a typical architecture may include more or fewer components than illustrated in FIG. 2. For example, although a single UPFA server 140 is shown, network architecture 200 may include additional UPFA servers 140 (e.g., architecture may include multiple UPFA servers 140 that provide redundancy in event of failure of a particular UPFA server 140). Additionally, network architecture 200 may include a number of other networks.

Content distribution network architecture 200 may be implemented to provide user feedback based content distribution areas. FIG. 2 depicts a static instance of content distribution network architecture 200 that includes a user feedback based content distribution area 230 served by eNBs 114 (eNB 114-1 and eNB 114-2) that provide particular content. The user feedback based content distribution area 230 may include a geographic area receives particular content via the eNBs 114. As discussed herein below, eNBs 114 may be added or removed from the content distribution area 230 based on user feedback. In other words, eNBs 114 may dynamically change from active to inactive with respect to the user feedback based content distribution area 230 (thus decreasing the geographic area that the particular content is distributed). For example, eNB 114-x may be added to the content distribution area 230 based on user devices 102 served by that eNB 114 requesting content from that content distribution area 102.

User devices 102 may receive (from a user) an option to select a particular schedule of content, for example, via a super content EPG selection interface 500, as described below with respect to FIG. 5. The service provider may broadcast/multicast an electronic program guide that includes actual scheduled programs and a separate but related super content EPG selection interface 500 that includes programs that may be scheduled based on user feedback. In other words there may be a hard (or "set") schedule of video programs (i.e., actual scheduled video programs) and a soft (or tentative, user feedback based) schedule of video programs that may be added to the actual scheduled video programs based on user feedback. Both schedules of content may include a number of (in some instances, predetermined) concurrently scheduled video programs. User devices 102 may download content (for example, video programs) based on user input. User devices 102 may provide feedback (e.g., via unicast) regarding preferred content to be scheduled in a content distribution area 230, for example as described below with respect to FIG. 7. User devices 102 may provide the feedback via unicast to SGW 132 and then to UPFA server 140.

eNBs 114 may multicast video programs in user feedback based content distribution areas 230 based on direction received from UPFA server 140 (in conjunction with BMSC 136 and BVPS 210). Each eNB 114 may serve a cell of a user feedback based content distribution area 230. MME 130, SGW 132, and PGW 134 may transmit communications from user devices 102 to network devices, including UPFA server 140.

UPFA server 140 may capture feedback from users identifying particular video content items that the users are interested in scheduling to be viewed. Users may express interest in multiple concurrent broadcast (or multicast) video programs. UPFA server 140 may rank the video programs based on popularity and other additional metrics such as associated sponsors, content type, etc. UPFA server 140 may determine user feedback based content distribution areas 230 based on the ranked content, which user has selected which channel to watch, the location of the users, network resources, etc., such as described with respect to FIG. 4 herein below. UPFA server 140 may select eNBs 114 to include in the content distribution (e.g., MBSFN) area and control implementation of the user feedback based content distribution areas 230. In contrast to conventional content distribution areas, which are static, UPFA server 140 may modify the user feedback based content distribution areas 230 before and during the broadcast of the scheduled programs. UPFA server 140 may then create (or generate) eMBMS channels (202) and provision the eMBMS channels in conjunction with BVPS 210, video content source 220 and BMSC 136 based on the user feedback.

BVPS 210 may receive information from UPFA server 140 and provide beginning forward error correction (FEC) and modulation and coding scheme (MCS) values for a broadcast/multicast. BVPS 210 may dynamically provision based on user feedback. BVPS 210 may provision small cells for eMBMS in the content distribution area 230.

Video content source 220 may provide video content. For example, video content source may provide a live broadcast source or alternatively prerecorded video programs that may be multicast at a prescheduled time. In some instances, video content source 220 may provide a schedule of video content available at the prescheduled time to be selected by the users of user devices 102 (i.e., to form the basis of user feedback). Alternatively, a super schedule of video content that may be made available may be retrieved from a source independent of the video content source.

BMSC 136 may receive fixed values of FEC and MCS for a particular multicast/broadcast based on deployed radio topology. In one example, BMSC 136 may receive fixed values of FEC and MCS from BVPS 210. BMSC 136 may manage provisioning of multicast services or broadcast services to user devices 102 based on the beginning values of FEC and MCS. For example, BMSC 136 may provide a signal (i.e., broadcast packets) that includes FEC of the transmitted data. Additionally, eNBs 114 may use the fixed MCS values to transmit the broadcast/multicast via MBMS GW 138.

Content distribution network architecture 200 may enable the implementation of intelligent and informed content distribution area 230 based on user feedback that is received, for example, prior to and after a multicast transmission begins. In other words, while FIG. 2 shows a static configuration of network distribution architecture 200 with respect to particular content and content distribution areas 230 at a certain time, BVPS 210, video content source 220 and BMSC 136 may change values based on user feedback. Content distribution network architecture 200 may be applied to licensed band LTE multicasts that is dynamically configured based on short term user interaction and expressed preference.

Figure 3:
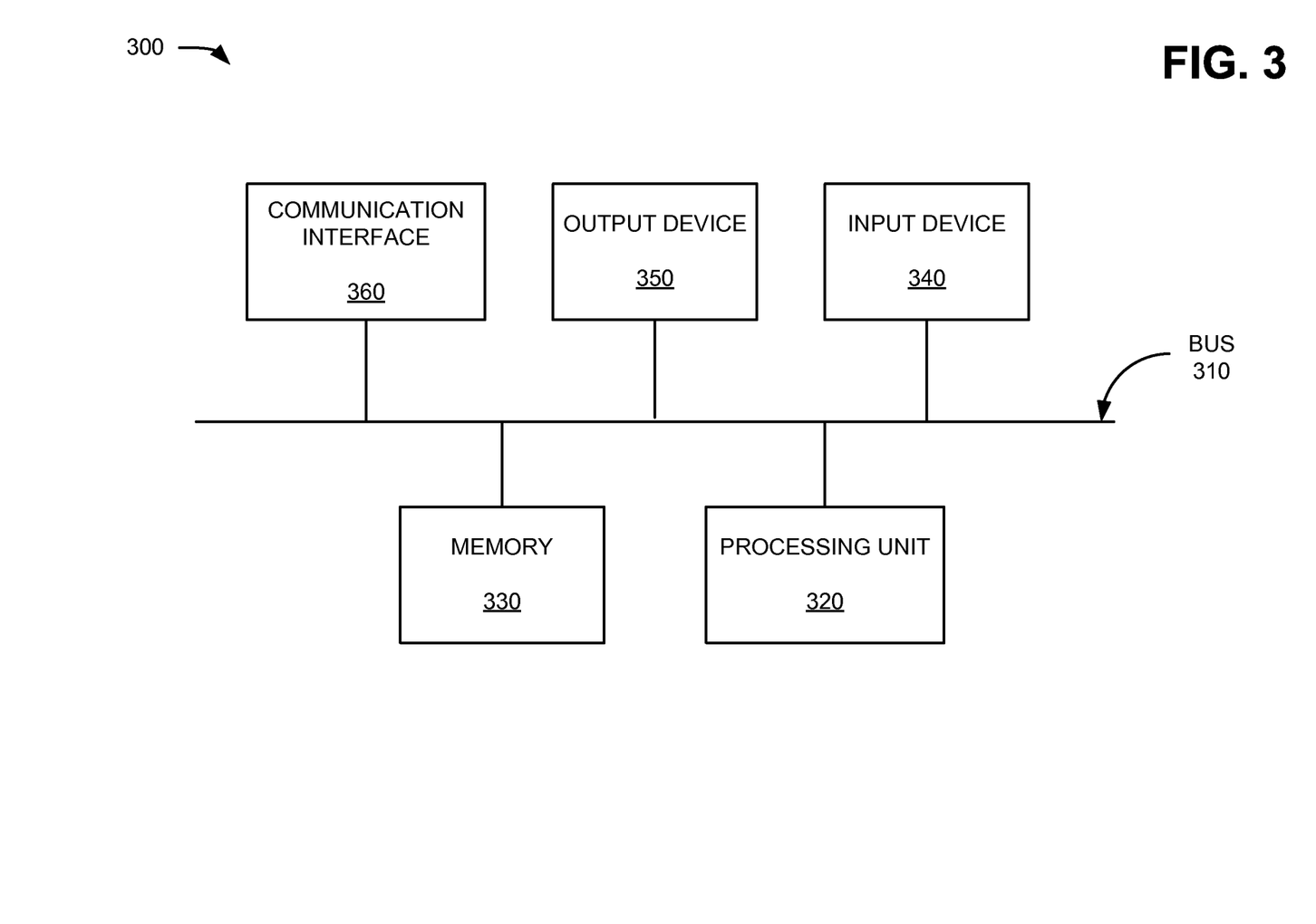
FIG. 3 illustrates an exemplary configuration of one or more of the components of FIGS. 1 and 2.

FIG. 3 is a diagram of example components of a device 300. Each of user device 102, one or more devices in AN 104, EPC 106, PDN 110, E-UTRAN 112, eNB 114, HSS 120, PCRF 122, MME 130, SGW 132, PGW 134, BMSC 136, MBMS GW 138, UPFA server 140, BVPS 210 and video content source 220, as described in FIGS. 1-2 above, may include one or more devices 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of network 100.

As described herein, device 300 may perform certain operations in response to processing unit 320 executing machine-readable instructions contained in a computer-readable medium, such as memory 330. A computer-readable medium may be defined as a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processing unit 320 to perform processes described herein. Alternatively, hardwired circuitry may be used in place of or in combination with machine-readable instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
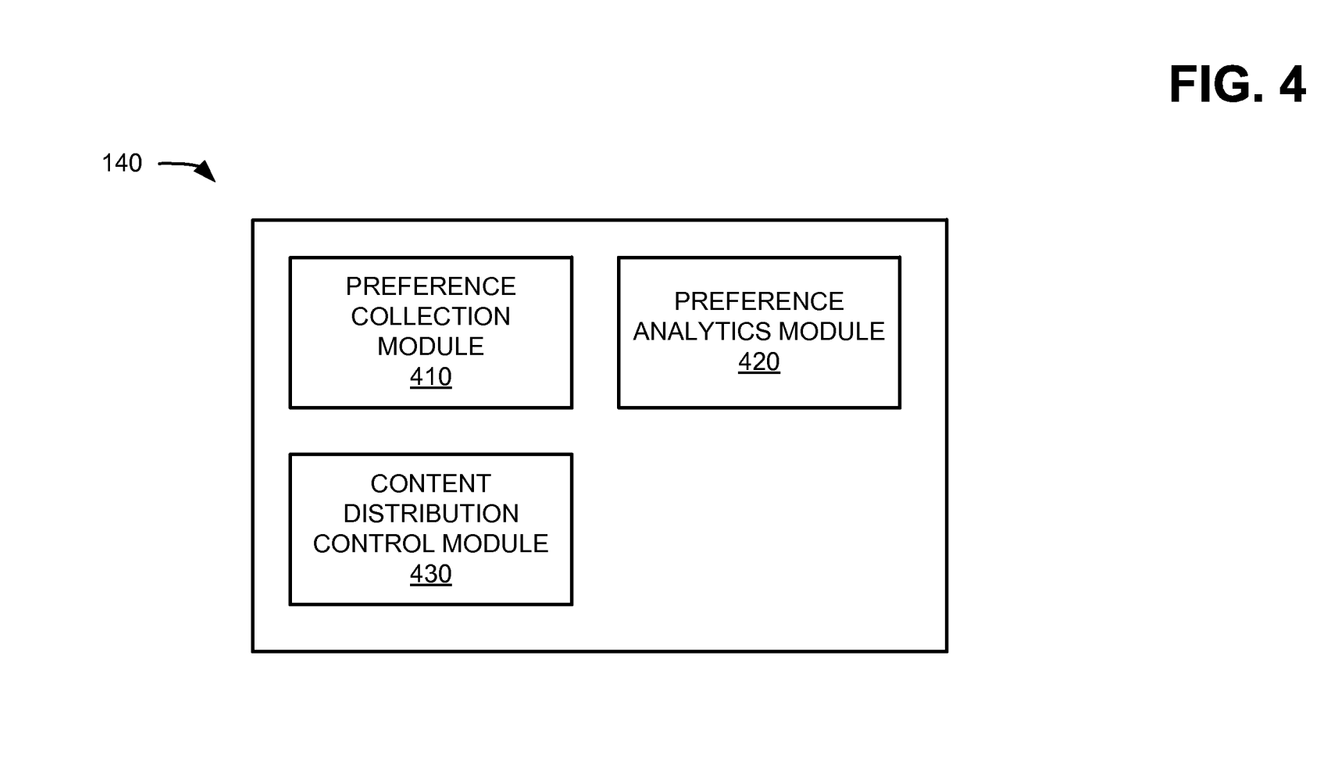
FIG. 4 is a functional block diagram of the user preference analytics server of FIGS. 1 and 2.

FIG. 4 is an exemplary functional block diagram of UPFA server 140 according to an exemplary implementation. UPFA server 140 may include a preference collection module 410, a preference analytics module 420 and a content distribution control module 430. The logical blocks illustrated in FIG. 4 may be implemented in machine-readable instructions, hardware, or a combination of hardware and machine-readable instructions. For example, in one implementation, all or some of the logical blocks illustrated in FIG. 4 may be implemented by processing unit 320 (FIG. 3) executing machine-readable instructions stored in, for example, memory 330. Functions associated with UPFA server 140 are also described with respect to super content electronic program guide (EPG) selection interface 500 and user device to eNodeB mapping table 600, illustrated in FIGS. 5 and 6, respectively, and described herein below.

Preference collection module 410 may receive feedback from user devices 102, for example via input to super content EPG selection interface 500, such as described below with respect to FIG. 5, and automated data gathering processes (that may include a requirement for explicit opt in by the user) with regard to cell IDs and other location information. The user feedback may include eNodeB addresses of eNBs 114 associated with (or currently serving) the user devices 102. Furthermore, a client application in the user device 102 may send information relating to a user's interest, geo-location and cell identifier (ID) information, etc. to UPFA server 140. Preference collection module 410 may receive the location coordinates (or other location data) of the user devices 102 that may be updated continuously until each scheduled video program starts (and in some instances throughout multicasting of the video program as user demand is logged and network resources are identified and availability is determined). Preference collection module 410 may record and store the interested users' geo-location, cell-ID and content consumption intent in an associated data storage device, for example in a table such as table 600, discussed herein below with respect to FIG. 6.

Preference analytics module 420 may generate content distribution areas 230 based on the locations of user devices 102 and the indications of the content that they are interested in. Preference analytics module 420 may analyze user feedback including popularity of preferred content, user location, serving eNBs 114, etc. Preference analytics module 420 may select a size of an area of the at least one content distribution area that allows mobility of the at least one user device. Preference analytics module 420 may generate the content distribution area 230 based on the selected size to allow mobility of the user device 102. Preference analytics module 420 may include the user's current cell and nearby cells in the user feedback based content distribution area 230. For example, preference analytics module 420 may determine a size of a content distribution area 230 based on the location of the users as well as any adjoining cells to allow some flexibility to manage the user's movement. In some instances, preference analytics module 420 may continuously determine the size and location of additional cells (to include in the content distribution area) based on the speed and trajectory of the user device 102 (to allow the ability for the content distribution area 230 to remain overlapping while one or more users are traveling). Preference analytics module 420 may allow limited mobility for the user within the content distribution area 230.

Content distribution control module 430 may implement the user feedback based content distribution area 230 based on information determined by preference analytics module 420. For example, content distribution control module 430 may provide instructions for BVPS 210, video content source 220 and BMSC 136 to deploy the determined content and schedules in the corresponding user feedback based content distribution areas 230. If, while the content is playing, more users from nearby geographical areas (i.e., close or adjoining cells) show interest in consuming the content, content distribution control module 430 may provide instructions for the BMSC 136 to include the cells into same area in which the content is playing, thereby expanding the area. Content distribution control module 430 may modify user feedback based content distribution area 230 based on preference, location and participation of the user. In some instances, content distribution control module 430 may require a threshold number of users to begin broadcast/multicast in a particular cell. Once threshold number is attained, users may be guaranteed to continue receiving the related broadcast/multicast.

According to an embodiment, while the content is being multicast, content distribution control module 430 may determine that some users within the user feedback based content distribution areas 230 have discontinued consuming content. Content distribution control module 430 may determine a reduced user feedback based content distribution area 230 that serves the remaining users and provide instructions to BVPS 210 and BMSC 136 to implement this reduced user feedback based content distribution area 230. While content is playing, content distribution control module 430 may remove eNBs 114 from the content distribution area for those eNBs 114 that serve customers that have terminated their viewing sessions. Content distribution control module 430 may give users that terminate viewing sessions a grace period to rejoin session (e.g., multicast continues for two minutes after a user has logged off). Content distribution control module 430 may 230 contract the user feedback based content distribution area to save network resources (based on a determination that contracting the user feedback based content distribution area 230 will save resources).

Content distribution control module 430 may save network resources by targeting content only in the areas where interested users are located and without affecting the quality of experience (QoE) for the users.

Figure 5:
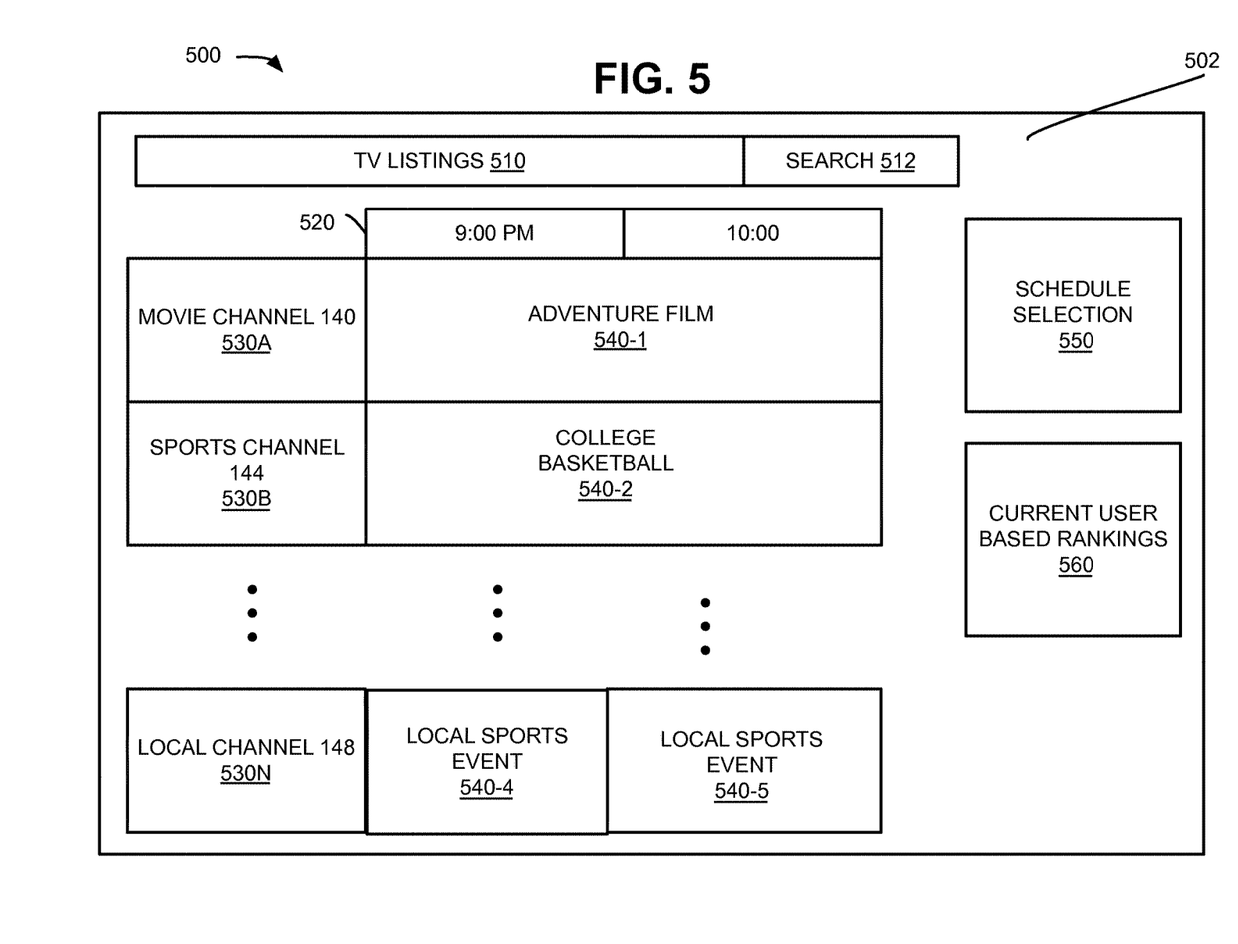
FIG. 5 illustrates an exemplary super content electronic program guide selection interface.

FIG. 5 illustrates an exemplary super content EPG selection interface 500. As shown in FIG. 5, super content EPG selection interface 500 may include a display interface 502, a TV listings header 510, a search function 512, a scheduled time 520, potential video program channels 530 (for example, shown in FIG. 5 as movie channel 530A, sports channel 530B, to local channel 530N) and a corresponding listing of potential video programs 540 that may be scheduled to broadcast via the content distribution area 230 on these channels 530 (for example, shown in FIG. 5 as adventure film 540-1 corresponding to movie channel 140 530A, college basketball 540-2, corresponding to sports channel 144 530B, etc.), a schedule selection tool 550, and a current user based ranking 560. Although particular components of super content EPG selection interface 500 are shown in FIG. 5, it should be understood that these are by way of example and that fewer, different or additional components may be included in super content EPG selection interface 500 that may be used to provide user feedback regarding preferred content to be scheduled via user feedback based content distribution areas 230.

Super content EPG selection interface 500 may include an EPG that displays a superset of available potential video programs 540 that may potentially be scheduled for broadcast in the user feedback based content distribution areas 230. The potential video program 540 is a video program that may potentially be scheduled for broadcast in the user feedback based content distribution areas 230 but is currently only scheduled in the superset or super content EPG selection interface 500. Super content EPG selection interface 500 may be displayed on a display interface 502 of user device 102. Display interface 502 may allow the user to view and select particular potential video programs 540 to indicate that the user is submitting the potential program 540 for multicast in their content distribution area 230. Display interface 502 may include a GUI, a touch screen interface, etc., which may allow the user to interact with the selected potential video programs. TV potential listings header 510 may indicate that the content may potentially be added to a schedule of programs that is to be multicast to a contest distribution area 230 in which the user device 102 is currently located. Search function 512 may allow the user to search for potential video programs 540 and corresponding scheduled times of the potential video programs 540.

Users may be presented (through the graphical user interface (GUI) of user devices 102) with available potential video program 540, channel 530 of the potential video program, and time of delivery 520 in selection interface 500. Available potential video programs channels 530 may indicate particular channels at which video programs may be aired. Potential video program channels 530 may include channels and video programs 540 that may be scheduled for multicast at a predetermined time 520 on the particular channel based on user feedback (e.g., shown as 9:00 PM in FIG. 5). The scheduled time may be within a time window (or predetermined time span) of the current time, such as a two day time span from the current time. Each potential video program 540 may be displayed as either a screen capture (cap) or other representative image relating to the potential video program, a text description of the potential video program, or both an image an a text description. The potential video program 540 may be displayed with a corresponding predetermined time 520 at which the potential video program may be scheduled to air in the content distribution area (e.g., thirty minutes from a current time).

Schedule selection tool 550 may allow the user to select and rank potential video programs 540 to be scheduled in the predetermined times 520 for multicast within the content distribution area 230. Users may confirm interest in consuming the content, for example, by clicking on particular potential video programs 540. The users may select one or more potential video programs up to a predetermined limit (e.g., in one example the user may select up to four potential video programs to be scheduled for concurrent multicast). Schedule selection tool 550 may allow the user to express interest in (i.e., potential consumption of) the potential video programs 540 in various ways. For example, the user may indicate that the user intends to watch or buy a potential video program 540 if the service provider multicasts the potential video program 540 in the user feedback based content distribution area 230 at the predetermined time. The user may also indicate a ranking order of potential video programs that the user is interested in. The preferred content may be given different weights according to ranking order. Current user based rankings 560 may indicate the current ranking of potential video programs 540 based on overall popularity within the user feedback based content distribution area 230 (e.g., adventure film 540-1 may currently be ranked number one for 9:00 PM). Current user based rankings 560 may be an ongoing ranking that UPFA server 140 may freeze into a set schedule after a predetermined end time (i.e., a "cut off" time for scheduling).

According to another implementation, the available programs may be presented in a mosaic display (not shown) that corresponds to all video programs available at a particular time. The user may choose a number of the potential video programs from the mosaic display that they would like to be scheduled for multicast. The user may select a content item to access additional detail regarding the video program (e.g., the screen cap may expand to show larger/different images and additional text).

The user feedback may be captured by a user feedback client application on user device 102. The user feedback client application may collect and send the information on users' interest in potential video programs 540, geo-location and cell ID to UPFA server 140, BVPS 210 and BMSC 136. UPFA server 140 may receive the user feedback from user device 102 and use the user feedback in determining video programs to be scheduled and multicast within user feedback based content distribution area 230 that include eNBs 114 serving the user device 102.

Figure 6:
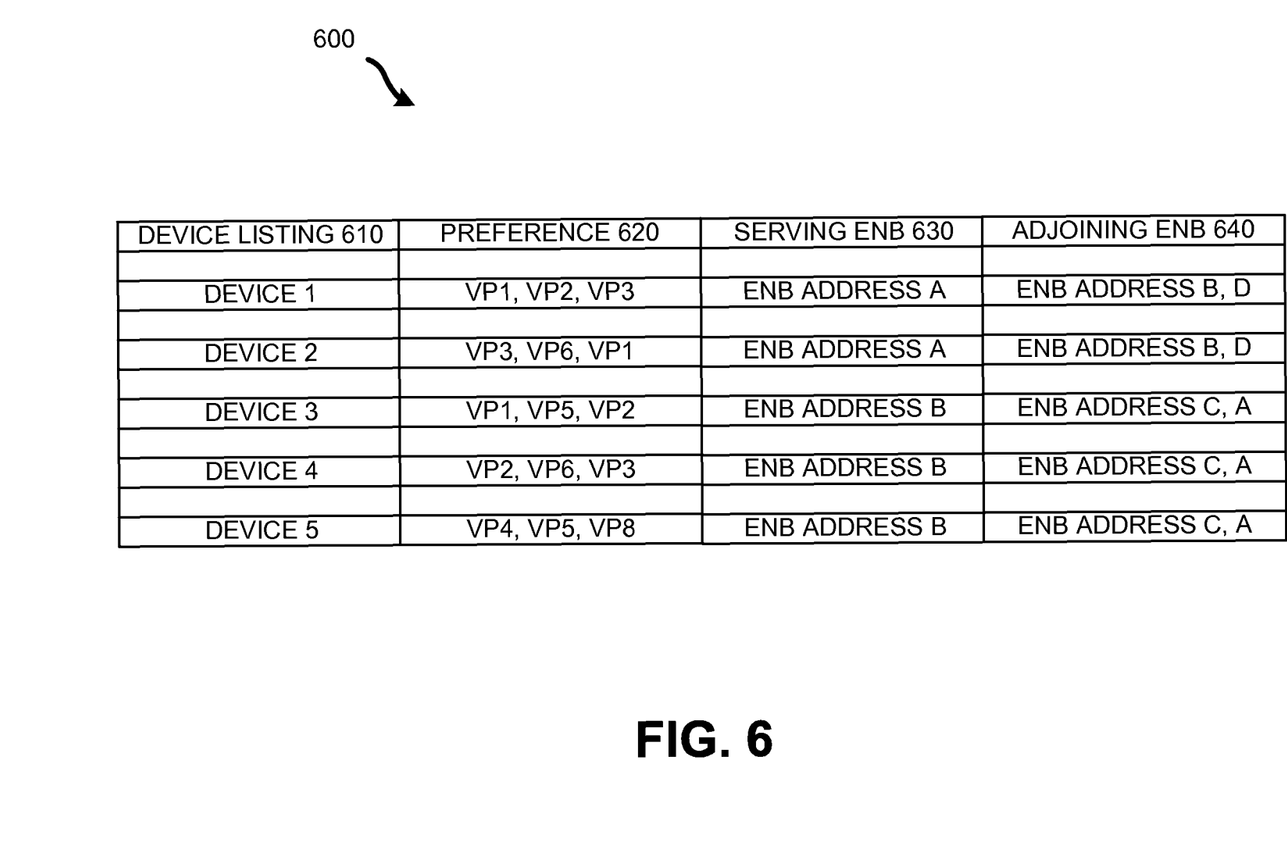
FIG. 6 is an exemplary user device to eNodeB mapping table.

FIG. 6 is an exemplary user device 102 to eNodeB 114 mapping table 600. Table 600 includes a device listing 610 of user devices 102, preferences 620 for potential video programs selected by user devices 102 (e.g., VP1, VP2 and VP3 have been selected by device 1), a corresponding listing of serving eNodeBs 630 of eNBs 114 that currently serve the user devices 102 and an adjoining eNodeB listing 640 of bordering eNBs 114 to the eNodeB 114 that serves each user device 102.

Device listing 610 may list user devices 102 (listed in table 600 as devices 1 to 5, which may each represent a user device 102) that are served by eNBs 114 associated with UPFA server 140. Each of the user devices 102 may be associated with a different user and user account. Preferences 620 may list potential video programs selected by user devices 102 for multicast at the predetermined times (i.e., video programs the user has indicated an interested in). The preferences 620 may be listed in terms of ranking order (for each device) of video programs at particular slots in a time schedule (e.g., device 1 has a first program, VP1, ranked first, a second program, VP2, ranked second and a third program, VP3, ranked third for that particular user or device 102). Serving eNodeBs 630 may list eNBs 114 that currently serve each of the user devices 102. For example, serving eNodeBs 630 may list an eNodeB address of the serving eNodeB 114 for each particular device (e.g., shown in FIG. 6 as eNodeB address A for devices 1 and 2). Adjoining eNodeBs list 640 may list bordering or adjacent eNBs 114 to the eNBs 114 that serve the listed devices 610. Adjoining eNodeBs list 640 may allow UPFA server 140 and other network devices to provide mobility of the user device 102 within the content distribution area 230 by adjusting the content delivery area 230 to provide some latitude of movement for user device 102.

UPFA server 140 may access the information in table 600 to determine user feedback based content distribution areas 230. In some instances, user device 102 may not be active (e.g., user device 102 moves to idle mode). UPFA server 140 may map the user device's 102 geographic location (geo-location) to the eNodeB's 114 geo-location. UPFA server 140 may group devices by eNBs 114, content requested, etc., and analyze the information to determine user feedback based content distribution areas 230 that reduce network resource usage (when compared to conventional content distribution areas) while the option for user devices 102 to receive targeted multicasts. UPFA server 140 may determine the video programs to be scheduled in the user feedback based content distribution areas 230 within predetermined parameters based on the user feedback (e.g., UPFA server 140 may attempt to ensure that all users receive at least one of their choices via multicast).

Figure 7:
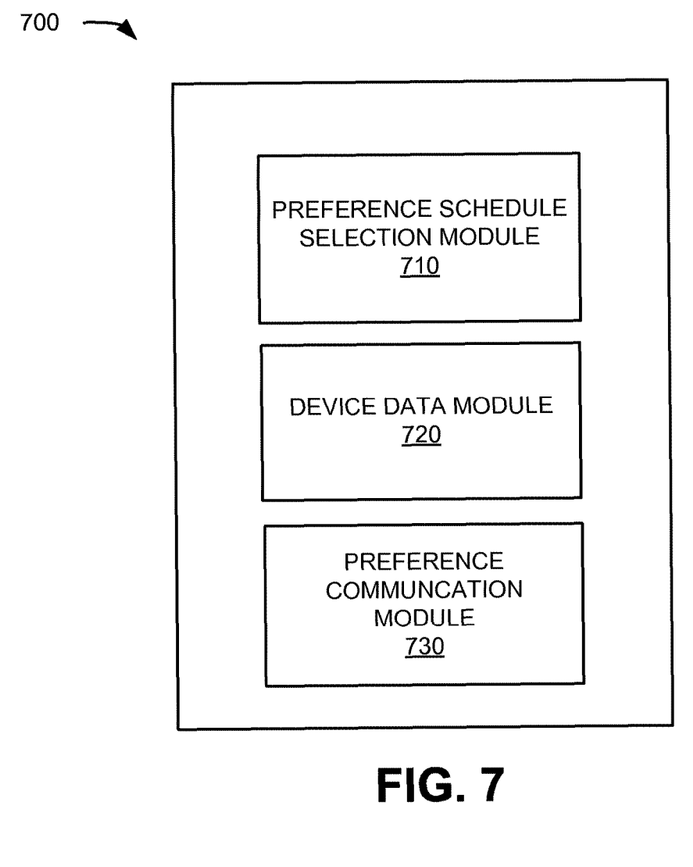
FIG. 7 is a functional block diagram of the feedback enabled user device of FIG. 2.

FIG. 7 illustrates an exemplary functional block diagram of preference feedback client 700. Client 700 may comprise software, hardware, or a combination of hardware and software used to provide preference feedback on user device, such as user device 102 described above. As shown, preference feedback client 700 may include a preference schedule selection module 710, a device data module 720 and a preference communication module 730. The configuration of components of preference feedback client 700 illustrated in FIG. 7 is for illustrative purposes only. Other configurations may be implemented. Therefore, preference feedback client 700 may include additional, fewer and/or different components than those depicted in FIG. 7.

Preference schedule selection module 710 may present users (through the GUI of user device 102) with available potential video programs and time of delivery. Preference schedule selection module 710 may be implemented in conjunction with super content EPG selection interface 500. Users may confirm interest in consuming particular content and the user feedback may be provided to UPFA server 140.

Device data module 720 may identify information regarding eNodeBs 114 that a user device 102 is currently attached to and a location of user device 102. Device data module 720 may also gather additional information regarding capabilities of device, formats of video, etc., to be transmitted UPFA server 140.

Preference communication module 730 may provide feedback to UPFA server 140. In particular, preference communication module 730 may transmit information relating to the user's interest in potential video programs, as well as the geographic location and/or cell ID information of user device 102 to UPFA server 140 and BMSC 136. Preference communication module 730 may send the information via unicast to UPFA server 140 and/or BMSC 136.

After the user has selected particular potential video programs, the user may receive notification if the potential video programs are added to the set schedule of video programs that are to be multicast in the user feedback based content distribution area 230.

Figure 8:
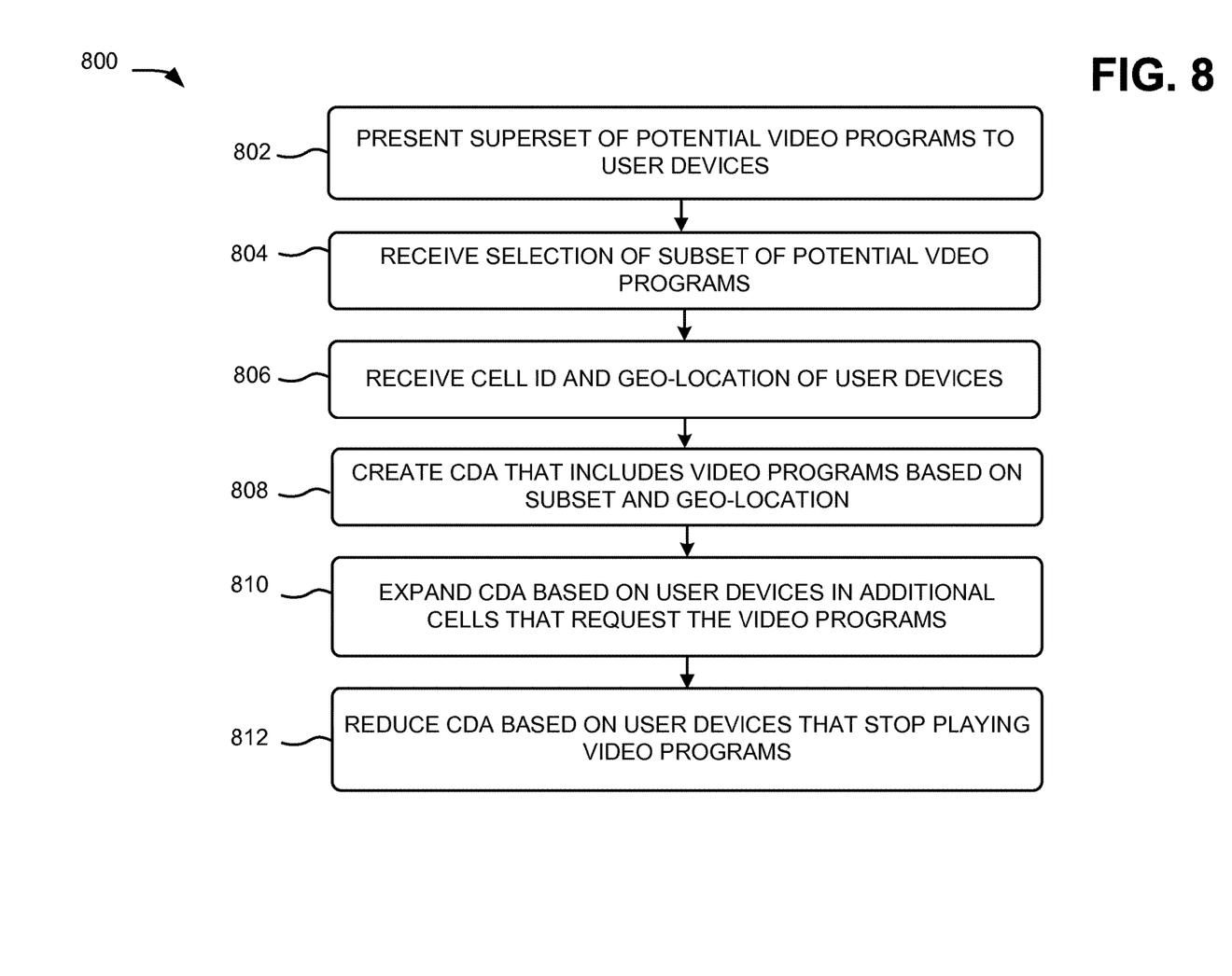
FIG. 8 is a flow chart of an exemplary process for determining a user feedback based content distribution area according to an implementation described herein.

FIG. 8 is a flow chart of an exemplary process for determining a user feedback based content distribution area according to implementations described herein. Process 800 is described with respect to content distribution architecture 200 shown in FIG. 2, for illustrative purposes. In one implementation, process 800 may be performed by UPFA server 140. In another implementation, some or all of process 800 may be performed by another device or group of devices, including or excluding UPFA server 140.

At block 802, UPFA server 140 may present a superset of potential video programs to each of the user devices 102. For example, UPFA server 140 may provide the superset in conjunction with an EPG server for super content EPG selection interface 500 in a GUI of each user device 102, such as described herein above with respect to FIG. 5. In some embodiments, UPFA server 140 may provide super content EPG selection interface 500 as a mosaic that includes the superset of potential video programs (that may be multicast in the content distribution area 230 based on user feedback).

UPFA server 140 may receive a selection of a subset of the potential video programs from each user device 102 (block 804). A user of the user device 102 may indicate intent to view or buy the potential video programs. In addition, UPFA server 140 may receive various types of information from the user devices 102 that tells UPFA server 140 how many user devices 102 are interested in content consumption and the particular potential video programs that the user devices 102 are interested in. For example, users may confirm interest in consuming particular content via super content EPG selection interface 500. The users may, in some instances, continuously update the particular content that they are interested in.

At block 806, UPFA server 140 may receive a geo-location and cell-ID for interested users (i.e., user devices 102). For example, UPFA server 140 may receive information from user devices 102 indicating where the users are located. In particular, a client application in each user devices 102 may send the information relating to user interests, geo-location and Cell ID information to UPFA server 140 and, directly or indirectly via UPFA server 140, to BMSC 136.

At block 808, UPFA server 140 may determine multiple user feedback based content distribution areas 230 based on the users' geo-locations and content (i.e., a subset of the video programs) for which the user devices 102 provide an indication of interest. UPFA server 140 may rank the video programs to be potentially multicast in the content distribution area 230 based on the popularity of the content among the user devices 102. BMSC 136 may intelligently (e.g., based on a combination of each particular user's geo-locations, popularity of content, user's consumption habits (e.g., whether the user has previously consumed content in which they indicated an interest), a minimum option requirement (e.g., each user may be required to receive at least one of their potential video programs where possible), network resources, etc.) create user feedback based content distribution areas 230 based on instructions from UPFA server 140. UPFA server 140 may determine the multiple user feedback based content distribution areas 230 in a manner that reduces network resource consumption. The size of determined content distribution areas 230 may be dependent on the location of the user devices 102 and may be made a predetermined size greater than required for a stationary broadcast to manage the user's movement to a limited extent. UPFA server 140 may determine user's current cell as part of the content distribution area 230 in addition to nearby cells. This may allow for limited mobility for the user.

UPFA server 140 may expand the content distribution areas 230 based on user devices 102 in additional cells that request the video programs (block 810). For example, while the content is playing, more users from nearby geographical areas may show interest in consuming the content. UPFA server 140 may provide instructions for BMSC 136 to then include the cells into same content distribution area 230 in which the content is playing thereby expanding the area.

UPFA server 140 may reduce the content distribution areas 230 based on user devices 102 that stop playing the video programs (block 812). For example, while content is playing and some users discontinue consuming the content, UPFA server 140 may be informed that particular users have discontinued viewing the video programs. This may result in particular cells not having any active user devices 102 with respect to the video programs and/or user feedback based content distribution areas 230. UPFA server 140 may provide a grace period for users that stop playing the subset of video programs to rejoin playing the video programs. UPFA server 140 may contract the content distribution area 230 if that contracting the content distribution areas 230 saves network resources (block 812).

Systems and/or methods described herein may determine user feedback based content distribution areas. The systems may allow for targeted multicast of content based on video programs in which the users have expressed prior interest.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   providing, to at least one user device, an electronic program guide (EPG) user interface that includes identifications of a superset of video programs and a corresponding timeslot for multicast delivery to a content distribution area that includes a cell that is serving the at least one user device;
   receiving, at a processing device via unicast before the corresponding timeslot for the multicast delivery, feedback from the at least one user device including:
      a selection of a subset of the superset of video programs from the at least one user device, wherein the selection indicates an intent to consume the subset of the superset of video programs during the corresponding timeslot for the multicast delivery,
      a geographic location of the at least one user device, and
      a cell identifier associated with the at least one user device;
   determining a ranking of the selection of the subset of the superset of video programs based on a popularity of the selection of the subset of the superset of video programs, wherein the popularity corresponds to an intention indicated by a plurality of user devices served by the cell to consume the subset of the superset of video programs during the corresponding timeslot for the multicast delivery;
   scheduling, based on the ranking, the subset of the superset of video programs for the multicast delivery during the corresponding timeslot for the multicast delivery;
   receiving a plurality of updates to the geographic location of the at least one user device;
   generating, by the processing device for the corresponding timeslot for the multicast delivery, a target content distribution area based on the updated geographic location of the at least one user device and a record of consuming via the at least one user device multicast video content for which an intention to consume was previously indicated by the at least one user device,
   wherein generating the target content distribution area includes provisioning a current base station that is serving the at least one user device and one or more bordering base stations in the target content distribution area to broadcast the subset of the superset of video programs;
   identifying, at the processing device, a demand and a geographic location of at least another user device for the multicast delivery of the subset of the superset of video programs after the corresponding timeslot for the multicast delivery; and
   dynamically expanding a size of the target content distribution area based on a determination that the geographic location of the at least other user device is outside of the cell.

2. The computer-implemented method of claim 1, further comprising:
   expanding the target content distribution area based on additional user devices in additional cells that request the multicast delivery of the subset of the superset of video programs.

3. The computer-implemented method of claim 1, further comprising:
   reducing the size of the target content distribution area based on the at least one user device terminating a viewing session after the corresponding timeslot for the multicast delivery of the subset of the superset of video programs.

4. The computer-implemented method of claim 3, further comprising:
   providing a grace period for the at least one user device to rejoin the viewing session before reducing the size of the target content distribution area.

5. The computer-implemented method of claim 1, wherein generating the target content distribution area further comprises:
   selecting a size of an area of the target content distribution area to allow mobility of the at least one user device; and
   generating the target content distribution area based on the selected size.

6. The computer-implemented method of claim 1, further comprising:
   providing an EPG that includes scheduled video programs to be multicast in the target content distribution area.

7. The computer-implemented method of claim 1, further comprising:
   continuously determining the size and location of additional cells to include in the target content distribution area based on a speed and a trajectory of the at least one user device.

8. The computer-implemented method of claim 1, wherein the selection further comprises:
   receiving an indication from the at least one user device of an intent to view or buy the subset of the superset of video programs.

9. The computer-implemented method of claim 1, further comprising:
   providing an EPG that identifies other video programs that have fixed scheduled times for multicast delivery.

10. The computer-implemented method of claim 1, wherein each of the subset of the video programs is assigned a different weight according to a ranking order by the at least one user device.

11. A device, comprising:
    a memory to store a plurality of instructions; and a processor configured to execute instructions in the memory to:
provide, to at least one user device, an electronic program guide (EPG) user interface that includes identification of a superset of video programs and a corresponding timeslot for multicast delivery to a content distribution area that includes a cell associated with the at least one user device;
receive, via unicast before the corresponding timeslot for the multicast delivery, feedback from the at least one user device including:
a selection of a subset of the superset of video programs from the at least one user device, wherein the selection indicates an intent to consume the subset of the superset of video programs during the corresponding timeslot for the multicast delivery,
a geographic location of the at least one user device, and
a cell identifier associated with the at least one user device;
determine a ranking of the selection of the subset of the superset of video programs based on a popularity of the selection of the subset of the superset of video programs, wherein the popularity corresponds to an intention indicated by a plurality of user devices served by the cell to consume the subset of the superset of video programs during the corresponding timeslot for the multicast delivery;
schedule, based on the ranking, the subset of the superset of video programs for the multicast delivery at the corresponding timeslot for the multicast delivery;
receive a plurality of updates to the geographic location of the at least one user device;
generate, at the corresponding predetermined time, a target content distribution area based on the updated geographic location of the at least one user device and a record of consuming via the at least one user device multicast video content for which an intention to consume was previously indicated by the at least one user device, wherein generating the target content distribution area includes provisioning a current base station that is serving the at least one user device and one or more bordering base stations in the target content distribution area to broadcast the subset of the superset of video programs;
identify a demand and a geographic location of at least another user device for the multicast delivery of the subset of the superset of video programs after the corresponding timeslot for the multicast delivery; and
dynamically expand a size of the target content distribution area to include another base station based on a determination that the geographic location of the at least other user device is outside of the cell.

12. The device of claim 11, wherein the processor is further configured to:
expand the target content distribution area based on additional user devices in additional cells that request the multicast delivery of the subset of the superset of video programs.

13. The device of claim 11, wherein the processor is further configured to:
reduce the size of the target content distribution area based on the at least one user device terminating a viewing session after the corresponding timeslot for the multicast delivery of the subset of the superset of video programs.

14. The device of claim 13, wherein the processor is further configured to:
provide a grace period for the at least one user device to rejoin the viewing session before the reducing the size of the target content distribution area.

15. The device of claim 11, wherein the processor is further configured to:
provide an EPG that identifies other video programs that have fixed scheduled times for multicast delivery.

16. The device of claim 11, wherein, when generating the target content distribution area, the processor is further configured to:
select a size of an area of the target content distribution area to allow mobility of the at least one user device; and
generate the target content distribution area based on the selected size.

17. A non-transitory computer-readable medium including instructions to be executed by a processor, the instructions including one or more instructions, when executed by the processor, for causing the processor to:
provide, to at least one user device, an electronic program guide (EPG) user interface that includes identification of a superset of video programs and a corresponding timeslot for multicast delivery to a content distribution area that includes a cell associated with the at least one user device;
receive, via unicast before the corresponding timeslot for the multicast delivery, feedback from the at least one user device including:
a selection of a subset of the superset of video programs from the at least one user device, wherein the selection indicates an intent to consume the subset of the superset of video programs during the corresponding timeslot for the multicast delivery,
a geographic location of the at least one user device, and
a cell identifier associated with the at least one user device;
determine a ranking of the selection of the subset of the superset of video programs based on a popularity of the selection of the subset of the superset of video programs, wherein the popularity corresponds to an intention indicated by a plurality of user devices served by the cell to consume the subset of the superset of video programs at the corresponding timeslot for the multicast delivery;
schedule, based on the ranking, the subset of the superset of video programs for the multicast delivery at the corresponding timeslot for the multicast delivery;
receive a plurality of updates to the geographic location of the at least one user device;
generate, at the corresponding predetermined time, a target content distribution area based on the updated geographic location of the at least one user device and a record of consuming via the at least one user device multicast video content for which an intention to consume was previously indicated by the at least one user device, wherein generating the target content distribution area includes provisioning a current base station that is serving the at least one user device and one or more bordering base stations in the target content distribution area to broadcast the subset of the superset of video programs;

identify a demand and a geographic location of at least another user device for the multicast delivery of the subset of the superset of video programs; and dynamically expand a size of the target content distribution area to include another base station based on a determination that the geographic location of the at least other user device is outside of the cell.

18. The non-transitory computer-readable medium of claim 17, wherein the one or more instructions further includes instructions for causing the processor to:

expand the target content distribution area based on additional user devices in additional cells that request the multicast delivery of the subset of the superset of video programs.

19. The non-transitory computer-readable medium of claim 17, wherein the one or more instructions further includes instructions for causing the processor to:

reduce the size of the target content distribution area based on the at least one user device terminating a viewing session after the corresponding timeslot for the multicast delivery of the subset of the superset of video programs.

20. The non-transitory computer-readable medium of claim 17, wherein the one or more instructions further includes instructions for causing the processor to:

provide an EPG that identifies other video programs that have fixed scheduled times for multicast delivery.

* * * * *